UNITED STATES PATENT OFFICE.

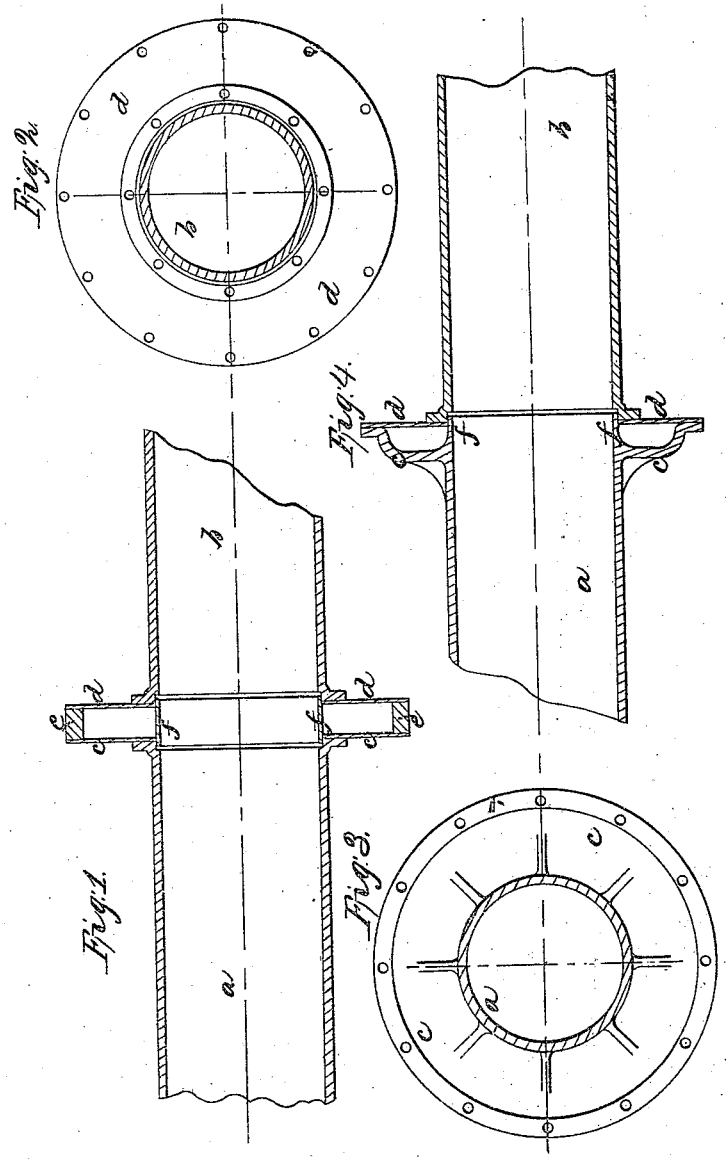

HAMILTON E. TOWLE, OF NEW YORK, N. Y.

IMPROVED JOINT FOR PIPES.

Specification forming part of Letters Patent No. 39,081, dated June 30, 1863.

*To all whom it may concern:*

Be it known that I, HAMILTON E. TOWLE, of New York, in the county and State of New York, have invented a new and useful Improvement in Joints for Pipes; and I do hereby declare that the following is a full, clear, and exact description of the same, reference being had to the accompanying drawings, making part of this specification, and to the letters of reference marked thereon.

The object of my invention is to furnish a flexible joint for pipes that will permit their bending and expansion and contraction without material change in their internal diameter; and it consists in fitting the ordinary flanges with a supplementary flange or pair of flanges sufficiently flexible to permit the movement required, and in covering the interior of the joint with a sliding sleeve corresponding in diameter to the diameter of the pipes. In this manner the use of stuffing-boxes, which require constant care and attention to their packing, may be avoided, and the flow of fluid through the pipe will be practically uniform throughout its length and over the joints, and unbroken by the eddies consequent upon an enlargement of the diameter, as in an ordinary bell-joint, which is as prejudicial to the delivery as a corresponding contraction would otherwise be.

With cast-iron water-pipes sufficient flexibility may be gained by the use of plate-iron supplementary flanges, of diameter varying from one and a half to twice that of the pipes, according to the use to which they are applied and the manner in which they are employed.

To enable others skilled in the arts to which my invention appertains to make and use the same, I will proceed to describe its construction and operation with reference to the drawings.

Figures 1 and 2 are a longitudinal section and an end view of the joint of a pair of cast-iron water-pipes made according to my invention; and Figs. 3 and 4 are similar views of a different construction of parts, also made according to my said invention.

The same letters indicate similar parts, or parts performing similar functions in the several figures.

The pipes $a$ and $b$ of Figs. 1 and 2 have comparatively thin plate-iron flanges $c$ and $d$, bolted to the ordinary flanges cast upon them, and are spaced at the peripheries by the cast-iron ring $e$, through which are passed their connecting bolts. The internal sleeve, $f$, is fitted loosely in recesses at the ends of the pipes to preserve the continuity of their bore, with sufficient play to permit the necessary contraction and expansion and with the flexibility required. This sleeve may be of iron or of india-rubber, cemented or otherwise secured to the interior of the pipes.

The pair of pipes represented in Figs. 3 and 4 have but one plate-iron flange to each joint, one of the pipes having the large flange $c$ and the sliding sleeve $f$ cast upon it.

I do not claim the separate parts I have described, as I am aware that joints with flexible bells and flanges have hitherto been made, and also that sleeves have been used on the exterior of pipes to make the joints when flanges have been inadmissible, and I do not wish to be understood as restricting myself to the precise proportions and arrangement of the parts herein specified, but I prefer the systems of construction similar to those which I have described and illustrated.

I claim as my invention and desire to secure by Letters Patent—

The combination of the flexible flange or flanges with an internal sleeve, substantially in the manner described, and for the purpose specified.

HAMILTON E. TOWLE.

Witnesses:
I. BURNHAM,
WM. KEMBLE HALL.